US012254609B2

(12) United States Patent
Miyagawa et al.

(10) Patent No.: US 12,254,609 B2
(45) Date of Patent: Mar. 18, 2025

(54) VIDEO MANAGEMENT APPARATUS, VIDEO MANAGEMENT METHOD, AND PROGRAM

(71) Applicant: NEC Corporation, Tokyo (JP)

(72) Inventors: Yusuke Miyagawa, Tokyo (JP); Seiji Gisushi, Tokyo (JP); Takeshi Shimonuri, Tokyo (JP); Isamu Konta, Tokyo (JP)

(73) Assignee: NEC Corporation, Tokyo (JP)

( * ) Notice: Subject to any disclaimer, the term of this patent is extended or adjusted under 35 U.S.C. 154(b) by 199 days.

(21) Appl. No.: 17/925,534

(22) PCT Filed: May 25, 2021

(86) PCT No.: PCT/JP2021/019741
§ 371 (c)(1),
(2) Date: Nov. 15, 2022

(87) PCT Pub. No.: WO2021/241550
PCT Pub. Date: Dec. 2, 2021

(65) Prior Publication Data
US 2023/0196542 A1 Jun. 22, 2023

(30) Foreign Application Priority Data

May 29, 2020 (JP) ................................ 2020-094553

(51) Int. Cl.
*G06T 7/00* (2017.01)
*G08B 21/02* (2006.01)
*H04N 7/18* (2006.01)

(52) U.S. Cl.
CPC ............ *G06T 7/0004* (2013.01); *G08B 21/02* (2013.01); *H04N 7/183* (2013.01); *G06T 2207/30164* (2013.01)

(58) Field of Classification Search
None
See application file for complete search history.

(56) References Cited

U.S. PATENT DOCUMENTS

2013/0242093 A1* 9/2013 Cobb .................. G06V 40/103
348/143
2014/0211027 A1* 7/2014 Worrill ............... H04N 21/2187
348/207.11

(Continued)

FOREIGN PATENT DOCUMENTS

JP  H06-119310 A   4/1994
JP  2001-356680 A  12/2001

(Continued)

OTHER PUBLICATIONS

English translation of Written opinion for PCT Application No. PCT/JP2021/019741, mailed on Aug. 10, 2021.

(Continued)

*Primary Examiner* — Stefan Gadomski
(74) *Attorney, Agent, or Firm* — Sughrue Mion, PLLC

(57) ABSTRACT

A video management apparatus 100a includes: an abnormality video registration unit 135 configured to associate a plurality of abnormality video data obtained in a respective plurality of first worksites at an abnormality occurrence time with the respective pieces of first worksite information related to safety of the respective first worksites, and to register the plurality of abnormality video data in an abnormality video database 125, in response to obtaining each of a plurality of pieces of abnormality occurrence information indicating abnormalities that have occurred at the respective plurality of first worksites; a notification processing unit 137 configured to notify a second terminal associated with a second worksite, of information related to the registration of these abnormality video data; and a video distribution processing unit 139 configured to distribute the abnormality video data associated with the second worksite from among the plurality of abnormality video data to the second terminal.

8 Claims, 13 Drawing Sheets

(56) References Cited

U.S. PATENT DOCUMENTS

| | | | | |
|---|---|---|---|---|
| 2018/0052835 A1* | 2/2018 | Billi-Duran | ............ | G06F 16/487 |
| 2018/0068189 A1* | 3/2018 | Daliyot | ............... | G06F 3/04842 |
| 2018/0285528 A1* | 10/2018 | Healey | .................. | G06N 20/00 |
| 2019/0012926 A1* | 1/2019 | Moss | .................... | G06Q 10/10 |
| 2019/0164402 A1* | 5/2019 | Lin | .................... | G06Q 10/1091 |
| 2019/0205010 A1* | 7/2019 | Fujii | .................... | G06F 3/03547 |
| 2019/0355275 A1* | 11/2019 | Su | ........................... | G06F 3/017 |
| 2020/0234380 A1* | 7/2020 | Dulori | ................ | G06Q 30/0283 |
| 2020/0237225 A1* | 7/2020 | Addison | .............. | A61B 5/1128 |
| 2020/0315515 A1* | 10/2020 | Kwatra | ............. | G08B 21/0476 |
| 2021/0173377 A1* | 6/2021 | Laftchiev | ............... | B25J 9/1674 |
| 2021/0177341 A1* | 6/2021 | Singh | .................. | A61B 5/0002 |

FOREIGN PATENT DOCUMENTS

| | | | |
|---|---|---|---|
| JP | 2003-242202 | A | 8/2003 |
| JP | 2004-145807 | A | 5/2004 |
| JP | 2009-163726 | A | 7/2009 |
| JP | 2010-237291 | A | 10/2010 |
| JP | 2017-033047 | A | 2/2017 |
| JP | 2018-142169 | A | 9/2018 |
| JP | 2019-082924 | A | 5/2019 |
| JP | 2019-102044 | A | 6/2019 |
| JP | 2019-174945 | A | 10/2019 |

OTHER PUBLICATIONS

International Search Report for PCT Application No. PCT/JP2021/019741, mailed on Aug. 10, 2021.
Written opinion for PCT Application No. PCT/JP2021/019741, mailed on Aug. 10, 2021.

* cited by examiner

| ASSOCIATION SOURCE | INPUT FROM ELECTRONIC KYM | | | | | | |
|---|---|---|---|---|---|---|---|
| MANAGEMENT NUMBER | DATE | TIME | WORK LOCATION | WORK NAME | CONTENT | EXPECTED DANGER | CONCRETE SECURITY MEASURES |
| 1 | yyyymmdd | hhmm | a | aaa | CARRYING-IN | HIT ONE'S HEAD, RUN OVER BY CRANE TRUCK AT ONE'S FOOT | WEAR SAFETY HELMET, WEAR SAFETY SHOES AND COOPERATION WITH DRIVER |
| 2 | yyyymmdd | hhmm | b | bbb | BASE MOUNTING WORK | | |
| 3 | yyyymmdd | hhmm | c | ccc | BASE INSTALLATION WORK | | |
| . | . | . | . | . | . | | |
| . | . | . | . | . | . | | |
| . | . | . | . | . | . | | |

| ASSOCIATION SOURCE | TYPE OF WEARABLE TERMINAL | | VIDEO DATA OBTAINING MEANS | | ASSOCIATION WITH ABNORMALITY VIDEO DB |
|---|---|---|---|---|---|
| MANAGEMENT NUMBER | DEVICE NAME | version | TYPE OF DEVICE | version | FILE NAME (AFTER CROPPING) |
| 1 | PULSE SENSOR a | a.a | RECORDING TERMINAL a | aaaa | aaa_trim1, aaa_trim2 |
| 2 | PULSE SENSOR b | b.b | RECORDING TERMINAL b | bbbb | bbb_trim1 |
| 3 | HEART RATE SENSOR a | c.c | RECORDING TERMINAL c | cccc | NULL |
| . | . | . | . | . | . |
| . | . | . | . | . | . |
| . | . | . | . | . | . |

Fig. 10

| MANAGEMENT NUMBER | DATE | TIME | FILE NAME | VIDEO LENGTH IN TIME |
|---|---|---|---|---|
| 1 | yyyymmdd | hhmm | aaa | hh:mm:ss |
| 2 | yyyymmdd | hhmm | bbb | hh:mm:ss |
| 3 | yyyymmdd | hhmm | ccc | hh:mm:ss |
| 4 | . | . | . | . |
| 5 | . | . | . | . |
| 6 | . | . | . | . |

Fig. 11

| MANAGEMENT NUMBER | DATE | TIME | FILE NAME (CROPPING SOURCE) | FILE NAME (AFTER CROPPING) | VIDEO LENGTH IN TIME | CROPPING START POSITION | CROPPING END POSITION | DETECTION DEVICE | TYPE | THRESHOLD (SET VALUE) |
|---|---|---|---|---|---|---|---|---|---|---|
| 1 | yyyymmdd | hhmm | Aaa | aaa_trim | hh:mm:ss | hh:mm | hh:mm | HEART RATE SENSOR | HEART RATE | xxx |
| 2 | yyyymmdd | hhmm | bbb | bbb_trim | hh:mm:ss | hh:mm | hh:mm | PULSE SENSOR | PULSE | xxx |
| 3 | . | . | . | . | . | . | . | . | . | . |
| 4 | . | . | . | . | . | . | . | . | . | . |
| 5 | . | . | . | . | . | . | . | . | . | . |
| 6 | . | . | . | . | . | . | . | . | . | . |

Fig. 12

VIDEO MANAGEMENT APPARATUS, VIDEO MANAGEMENT METHOD, AND PROGRAM

This application is a National Stage Entry of PCT/JP2021/019741 filed on May 25, 2021, which claims priority from Japanese Patent Application 2020-094553 filed on May 29, 2020, the contents of all of which are incorporated herein by reference, in their entirety.

TECHNICAL FIELD

The present invention relates to a video management apparatus, a video management method, and a program for performing management related to videos of accident cases that are to possibly occur at worksites and the like, for example.

BACKGROUND ART

Various accidents occur at worksites such as construction sites. Although measures for accident prevention are taken, accidents similar to accidents that have occurred in the past may occur repeatedly. New measures and norms tend to increase with occurrence of accidents. In other words, man-hours at sites or of managers tend to increase.

Moreover, concentration of workers is dispersed into norms and actual work. This may increase loads and stress and consequently affect work efficiency. Such accidents and near-miss incidents that occur in worksites may occur due to various reasons based on environment and background of work and the like.

Known accidents, cases, and the like are used for education for raising of safety awareness and reinforcement of norms. However, it is difficult to equally share, among workers, sense of urgency and fear of a time when such an accident occurs, for example. In addition, problems and remedial measures for accidents and cases are based on records and memory of those who are concerned with the accidents/cases, and are hence not unified in terms of accuracy. In other words, it is difficult to cover all intrinsic causes and make education audiences continue raising awareness of accident prevention.

For problems as those described above, for example, PTL 1 discloses that a group check activity table is used in checking cautions in a group check activity and that the group check activity table is created by a scheduled worker entering predetermined items.

PTL 2 discloses that a camera image obtained by a camera attached to a worker is stored in an image database: a camera image determination unit determines, from a fluctuation measurement waveform of the camera image having an image level temporarily changed to be large, that the camera image includes an abnormality; and a manager terminal operated by a manager is notified that the worker is in an abnormal state with danger.

Further, PTL 3 discloses that a danger information database stores, in association with each other, information of a past accident (content, cause, cautions, and the like of the accident), a work content, a work image, a work location, and the like at a time when the accident has occurred.

CITATION LIST

Patent Literature

[PTL 1] JP 2019-174945 A
[PTL 2] JP 2018-142169 A
[PTL 3] JP 2004-145807 A

SUMMARY

Technical Problem

However, with the techniques disclosed in PTLs 1 to 3 described above, it is not possible to appropriately notify in real time, of accident cases that have occurred at a plurality of sites, another site where similar work is performed in the same time zone.

An example object of the present invention is to provide a video management apparatus, a video management method, and a program that make it possible to appropriately notify in real time, of accident cases that have occurred at a plurality of sites, another site where similar work is performed in the same time zone.

Solution to Problem

According to one example aspect of the present invention, a video management apparatus includes: a worksite information registration unit configured to register a plurality of pieces of first worksite information related to safety of a respective plurality of first worksites, in a database, depending on information sent from a plurality of first terminals associated with the respective plurality of first worksites: an abnormality occurrence information obtaining unit configured to obtain a plurality of pieces of abnormality occurrence information indicating abnormalities occurred at the respective plurality of first worksites: an abnormality video registration unit configured to associate a plurality of abnormality video data obtained in the respective plurality of first worksites at an abnormality occurrence time, with the respective pieces of first worksite information related to the safety of the respective first worksites, and to register the plurality of abnormality video data in a database, in response to obtaining each of the plurality of pieces of abnormality occurrence information: a notification processing unit configured to notify a second terminal associated with a second worksite, of information related to the registration of the plurality of abnormality video data; and a video distribution processing unit configured to distribute the abnormality video data associated with the second worksite from among the plurality of abnormality video data to the second terminal, in response to a request from the second terminal.

According to one example aspect of the present invention, a video management method includes: registering a plurality of pieces of first worksite information related to safety of a respective plurality of first worksites, in a database, depending on information sent from a plurality of first terminals associated with the respective plurality of first worksites: obtaining a plurality of pieces of abnormality occurrence information indicating abnormalities occurred at the respective plurality of first worksites: associating a plurality of abnormality video data obtained in the respective plurality of first worksites at an abnormality occurrence time, with the respective pieces of first worksite information related to the safety of the respective first worksites, and registering the plurality of abnormality video data in a database, in response to obtaining each of the plurality of pieces of abnormality occurrence information; notifying a second terminal associated with a second worksite, of information related to the registration of the plurality of abnormality video data; and distributing the abnormality video data associated with the second worksite from among the plurality of abnormality video data to the second terminal, in response to a request from the second terminal.

According to one example aspect of the present invention, a program for causing a computer to execute: registering a plurality of pieces of first worksite information related to safety of a respective plurality of first worksites, in a database, depending on information sent from a plurality of first terminals associated with the respective plurality of first worksites: obtaining a plurality of pieces of abnormality occurrence information indicating abnormalities occurred at the respective plurality of first worksites: associating a plurality of abnormality video data obtained in the respective plurality of first worksites at an abnormality occurrence time, with the respective pieces of first worksite information related to the safety of the respective first worksites, and registering the plurality of abnormality video data in a database, in response to obtaining each of the plurality of pieces of abnormality occurrence information: notifying a second terminal associated with a second worksite, of information related to the registration of the plurality of abnormality video data; and distributing the abnormality video data associated with the second worksite from among the plurality of abnormality video data to the second terminal, in response to a request from the second terminal.

Advantageous Effects of Invention

According to an aspect of the present invention, it is possible to appropriately notify in real time, of accident cases that have occurred in a plurality of sites, another site where similar work is performed in the same time zone. Note that, according to the present invention, instead of or together with the above effects, other effects may be exerted.

BRIEF DESCRIPTION OF THE DRAWINGS

FIG. 2 is a diagram illustrating a concrete example of terminals sending/receiving data to/from the video management apparatus 100a:

FIG. 7 is a diagram illustrating a concrete operation example at a time of registration of a KYM sheet, clothes, a tool, and the like;

FIG. 10 is a diagram illustrating a concrete example of information registered in a work management database 121:

FIG. 11 is a diagram illustrating a concrete example of information registered in a work video database 123:

FIG. 12 is a diagram illustrating a concrete example of information registered in an abnormality video database 125.

DESCRIPTION OF THE EXAMPLE EMBODIMENTS

Figure 1:
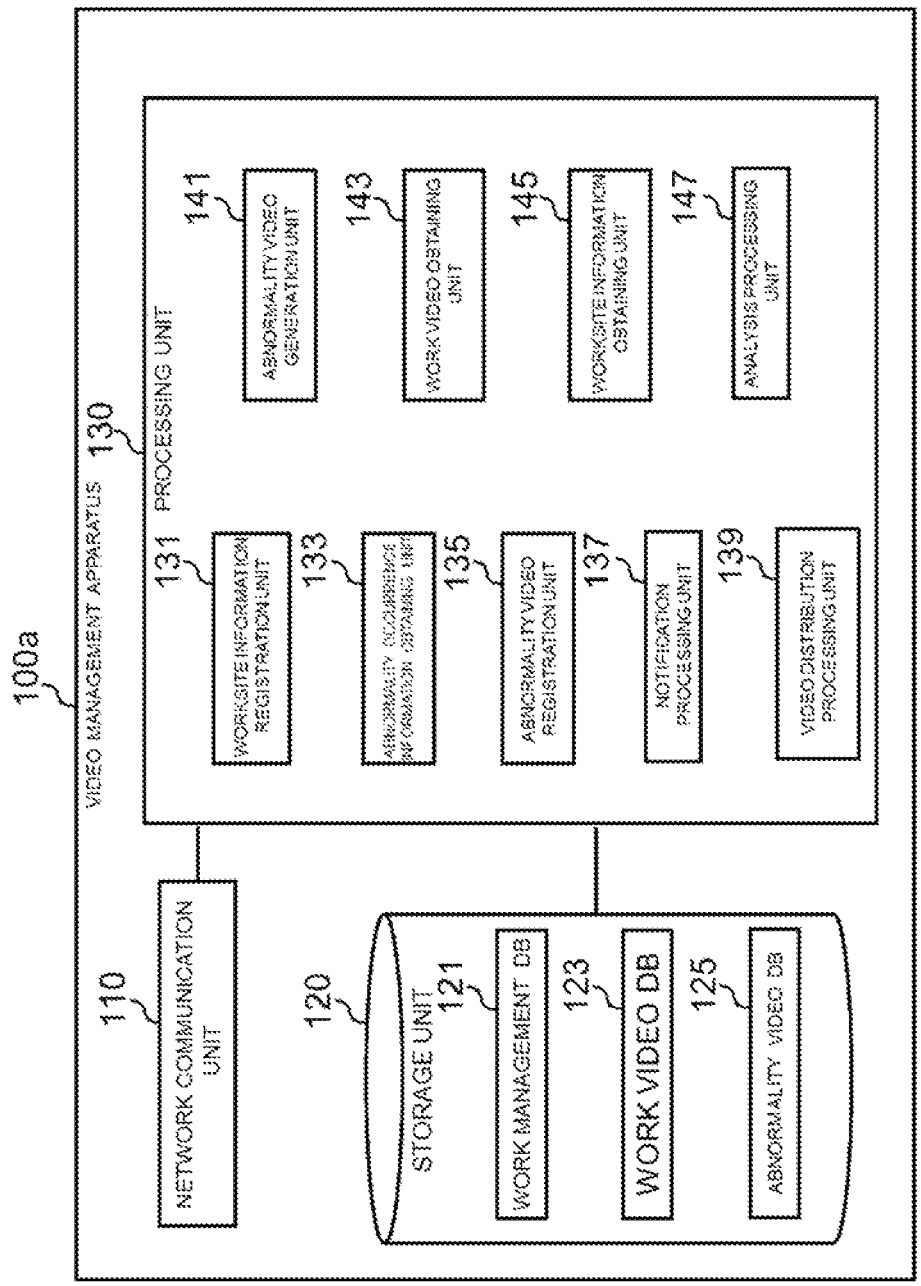
FIG. 1 is a block diagram illustrating an example of a schematic configuration of a video management apparatus 100a according to a first example embodiment.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of the Present Invention
2. First Example Embodiment
   2.1. Configuration of Video Management Apparatus 100a
   2.2. Operation Example
3. Second Example Embodiment
   3.1. Configuration of Video Management Apparatus 100b
   3.2. Operation Example
4. Other Example Embodiments

1. OVERVIEW OF EXAMPLE EMBODIMENTS OF THE PRESENT INVENTION

First, an overview of example embodiments of the present invention will be described.

(1) Technical Issues

Various accidents occur at worksites such as construction sites. Although measures for accident prevention are taken, accidents similar to accidents that have occurred in the past may occur repeatedly. New measures and norms tend to increase with occurrence of accidents. In other words, man-hours at sites or of managers tend to increase.

Moreover, concentration of workers is dispersed into norms and actual work. This may increase loads and stress and consequently affect work efficiency. Such accidents and near-miss incidents that occur in worksites may occur due to various reasons based on environment and background of work and the like.

Known accidents, cases, and the like are used for education for raising of safety awareness and reinforcement of norms. However, it is difficult to equally share, among workers, sense of urgency and fear of a time when such an accident occurs, for example. In addition, problems and remedial measures for accidents and cases are based on records and memory of those who are concerned with the accidents/cases, and are hence not unified in terms of accuracy. In other words, it is difficult to cover all intrinsic causes and make education audiences continue raising awareness of accident prevention.

For problems as those described above, for example, [Ref. 1] below discloses that a group check activity table is used in checking cautions in a group check activity and that the group check activity table is created by a scheduled worker entering predetermined items.

[Ref. 1] JP 2019-174945 A

[Ref. 2] below discloses that a camera image obtained by a camera attached to a worker is stored in an image database: a camera image determination unit determines, from a fluctuation measurement waveform of the camera image having an image level temporarily changed to be large, that the camera image includes an abnormality; and a manager terminal operated by a manager is notified that the worker is in an abnormal state with danger.

[Ref. 2] JP 2018-142169 A

Further, [Ref. 3] below discloses that a danger information database stores, in association with each other, information of a past accident (content, cause, cautions, and the like of the accident), a work content, a work image, a work location, and the like at a time when the accident has occurred.

[Ref. 3] JP 2004-145807 A

However, [Ref. 2], [Ref. 3], and the like describe no concrete procedure for registering past accident information in a database or the like and hence have a problem of being not able to provide, in real time, video of accident cases that have occurred at a plurality of sites to another site where similar work is performed at the same time.

Here, it is assumed in [Ref. 3] that manual input in one form or another is necessary in order to register past accident information. This leads to a problem that it is not possible to enter an abnormal event that has occurred at any time point, into a database immediately after the occurrence, to make a worker in another site aware of a similar abnormal event in advance on the same day. A technique described in [Ref. 3] has a problem of not being able to solve a current issue that a similar accident may occur before pieces of past accident information are accumulated. Another problem is that a database described in [Ref. 3] is not a database created by accumulating pieces of real-time accident information.

[Ref. 4] discloses that an accident response processing unit outputs a video of a response to a past accident case corresponding to an accident that has just occurred to a construction site to display the video. A technique described in [Ref. 4] is able to display a video from a viewpoint of accident but has a problem of not being able to display a video of an accident taking account of clothes, a tool, or the like of a worker. [Ref. 4] JP 2003-242202 A

[Ref. 4] also describes that an accident name is specified with reference to an accident database in which accident names, construction names, pieces of related danger prediction information, a situation content, pieces of photograph information are registered, which can provide a content of an accident that has occurred in the past. Hence, a technique described in [Ref. 4] has a problem of not being able to easily specify the name of a past accident in searching the accident database at a new worksite.

Further, [Ref. 5] discloses that, in a time zone and a day of the week for displaying a prescribed accident prevention warning, a display apparatus is caused to display an accident prevention warning image associated with the time zone and the day of the week. However, [Ref. 5] has a problem of not being able to display, in real time, accident data taking account of the situation of a worksite, equipment of a worker, and the like.

[Ref. 5] JP 2019-082924 A

Moreover, [Ref. 5] only discloses warning information in which the type of an accident and at least one of attributes including a day of the week, time, weather, and temperature are associated with each other. Hence, a technique described in [Ref. 5] does not take into account of how to associate the situation of a similar worksite, equipment of a worker, vital data (heart rate, pulse, or the like) of a worker, and the like. Here, [Ref. 5] only discloses that detection data is received from a wearable sensor attached to a worker, and that the degree of risk of work and the location and a health condition of the worker are displayed in a list on a display apparatus, based on the detection data. In other words, [Ref. 5] only discloses checking of a current state and has a problem of not concretely studying accumulation of videos of risk of work, search for and display of a video of a similar past accident, and the like, based on such information of the current state.

Hence, an example object of the present example embodiment is to make it possible to appropriately notify in real time, of accident cases that have occurred at a plurality of sites, another site where similar work is performed in the same time zone.

(2) Technical Features

In an example embodiment of the present invention, a plurality of pieces of first worksite information related to safety of a respective plurality of first worksites are registered in a database, depending on information sent from a plurality of first terminals associated with the respective plurality of first worksites: a plurality of pieces of abnormality occurrence information indicating abnormalities occurred at the respective plurality of first worksites are obtained: a plurality of abnormality video data obtained in the respective plurality of first worksites at an abnormality occurrence time are associated with the respective pieces of first worksite information related to the safety of the respective first worksites, and the plurality of abnormality video data are registered in a database, in response to obtaining each of the plurality of pieces of abnormality occurrence information: a second terminal associated with a second worksite is notified of information related to the registration of the plurality of abnormality video data; and the abnormality video data associated with the second worksite is distributed from among the plurality of abnormality video data to the second terminal, in response to a request from the second terminal.

According to this, it is possible to appropriately notify in real time, of accident cases that have occurred in a plurality of sites, another site where similar work is performed in the same time zone, for example. Note that the above-described technical features are a concrete example of the example embodiments of the present invention, and of course, the example embodiments of the present invention are not limited to the above-described technical features.

2. FIRST EXAMPLE EMBODIMENT

Next, a description will be given of a first example embodiment with reference to FIGS. 1 to 12.

2.1. Configuration of Video Management Apparatus 100a

With reference to FIG. 1, an example of a configuration of a video management apparatus 100a according to the first example embodiment will be described. FIG. 1 is a block diagram illustrating an example of a schematic configuration of the video management apparatus 100a according to the first example embodiment. With reference to FIG. 1, the video management apparatus 100a includes a network communication unit 110, a storage unit 120, and a processing unit 130.

(1) Network Communication Unit 110

The network communication unit 110 receives a signal from a network and transmits a signal to the network.

(2) Storage Unit 120

The storage unit 120 temporarily or permanently stores programs (instructions) and parameters for operations of the video management apparatus 100a as well as various data. The program includes one or more instructions for the operations of the video management apparatus 100a. The storage unit 120 includes a work management database 121, a work video database 123, and an abnormality video database 125. Concrete configurations of the work management database 121, the work video database 123, and the abnormality video database 125, and the like will be described later.

(3) Processing Unit 130

The processing unit 130 provides various functions of the video management apparatus 100a. The processing unit 130 includes a worksite information registration unit 131, an abnormality occurrence information obtaining unit 133, an abnormality video registration unit 135, a notification processing unit 137, a video distribution processing unit 139, an abnormality video generation unit 141, a work video obtaining unit 143, a worksite information obtaining unit 145, and an analysis processing unit 147. Note that the processing unit 130 may further include constituent elements other than these constituent elements. In other words, the processing unit 130 may also perform operations other than the operations of these constituent elements. Concrete operations of the worksite information registration unit 131, the abnormality occurrence information obtaining unit 133, the abnormality video registration unit 135, the notification processing unit 137, the video distribution processing unit 139, the abnormality video generation unit 141, the work video obtaining unit 143, the worksite information obtaining unit 145, and the analysis processing unit 147 will be described later in detail.

(4) Implementation Example

The network communication unit 110 may be implemented with a network adapter and/or a network interface card, and the like. The storage unit 120 may be implemented with a memory (e.g., a nonvolatile memory and/or a volatile memory) and/or a hard disk, and the like. The processing unit 130 may be implemented with one or more processors. The worksite information registration unit 131, the abnormality occurrence information obtaining unit 133, the abnormality video registration unit 135, the notification processing unit 137, the video distribution processing unit 139, the abnormality video generation unit 141, the work video obtaining unit 143, the worksite information obtaining unit 145, and the analysis processing unit 147 may be implemented with the same processor or may be implemented separately with different processors. The memory (storage unit 120) may be included in the one or more processors or may be provided outside the one or more processors.

The video management apparatus 100a may include a memory configured to store a program (instructions) and one or more processors that can execute the program (instructions). The one or more processors may execute the program to perform operations of the processing unit 130 (operations of the worksite information registration unit 131, the abnormality occurrence information obtaining unit 133, the abnormality video registration unit 135, the notification processing unit 137, the video distribution processing unit 139, the abnormality video generation unit 141, the work video obtaining unit 143, the worksite information obtaining unit 145, and/or the analysis processing unit 147). The program may be a program for causing a processor to execute the operations of the processing unit 130 (operations of the worksite information registration unit 131, the abnormality occurrence information obtaining unit 133, the abnormality video registration unit 135, the notification processing unit 137, the video distribution processing unit 139, the abnormality video generation unit 141, the work video obtaining unit 143, the worksite information obtaining unit 145, and/or the analysis processing unit 147).

2.2 Operation Example

Next, a concrete operation example according to the first example embodiment will be described.

According to the first example embodiment, the video management apparatus 100a (worksite information registration unit 131) registers a plurality of pieces of first worksite information related to safety of a respective plurality of first worksites, in a database (for example, the work management database 121), depending on information sent from a plurality of first terminals associated with the respective plurality of first worksites.

The video management apparatus 100a (abnormality occurrence information obtaining unit 133) obtains a plurality of pieces of abnormality occurrence information indicating abnormalities that have occurred at the respective plurality of first worksites.

The video management apparatus 100a (abnormality video registration unit 135) associates a plurality of abnormality video data obtained in the respective plurality of first worksites at an abnormality occurrence time, with the respective pieces of first worksite information related to the safety of the respective first worksites, and registers the plurality of abnormality video data in a database (for example, the abnormality video database 125), in response to obtaining each of the plurality of pieces of abnormality occurrence information.

The video management apparatus 100a (notification processing unit 137) notifies a second terminal associated with a second worksite, of information related to the registration of the plurality of abnormality video data.

The video management apparatus 100a (video distribution processing unit 139) distributes the abnormality video data associated with the second worksite from among the plurality of abnormality video data to the second terminal, in response to a request from the second terminal.

(1) First Worksite Information

The plurality of pieces of first worksite information are pieces of information registered depending on the information sent from the plurality of first terminals, as described above. Here, the first terminals are, for example, electronic danger-prediction-training-sheet registration terminal, photo taking cameras, wearable terminals, or the like used by workers of the first worksites.

Concretely, the electronic danger-prediction-training-sheet registration terminals send pieces of information related to danger prediction training (also referred to as KYT below) created by workers of the first worksites, to the video management apparatus 100a. In this case, the video management apparatus 100a registers the pieces of information related to the KYT received from the electronic danger-prediction-training-sheet registration terminals, in the work management database 121. In other words, each of the plurality of pieces of first worksite information includes the information related to the KYT.

The photo taking cameras send image data obtained by photographing by the workers of the first worksites or the like, to the video management apparatus 100*a*. In this case, the video management apparatus 100*a* (for example, the analysis processing unit 147) analyzes the image data received from the photo taking cameras and registers pieces of information obtained from results of the analysis, in the work management database 121. In other words, the plurality of pieces of first worksite information include respective pieces of information related to respective analysis results of image data sent from the photo taking cameras.

The wearable terminals send pieces of terminal identification information of the terminals to the video management apparatus 100*a*. In this case, the video management apparatus 100*a* registers the pieces of terminal identification information received from the wearable terminals, in the work management database 121. In other words, the plurality of pieces of first worksite information include the respective pieces of terminal identification information of the wearable terminals.

(2) Abnormality Occurrence Information

The plurality of pieces of abnormality occurrence information are based on respective pieces of information sent from abnormality detection apparatuses associated with the respective first worksites. For example, the abnormality occurrence information may include abnormality occurrence time information, abnormality occurrence content information, and the like. Concretely, the abnormality detection apparatuses are wearable terminals used by the workers of the first worksites, for example. In this case, the video management apparatus 100*a* (abnormality occurrence information obtaining unit 133) determines, based on biometric information or the like received from each of the wearable terminals, whether an abnormality has occurred for the worker using the wearable terminal, and obtains abnormality occurrence information associated with the first worksite in which the worker is working.

(3) Abnormality Video Data

Each of the plurality of abnormality video data is obtained as follows, for example. First, the video management apparatus 100*a* (work video obtaining unit 143) obtains the work video data obtained in the respective first worksites, in response to registering each of the plurality of pieces of first worksite information. Specifically, in a case of registration of the pieces of first worksite information in the work management database 121, the video management apparatus 100*a* (work video obtaining unit 143) obtains work video data of the first worksites associated with the pieces of first worksite information and stores the work video data in the work video database 123.

Next, the video management apparatus 100*a* (abnormality video generation unit 141) uses work video data obtained in the plurality of first worksites, to generate abnormality video data obtained in the respective first worksites at the abnormality occurrence time, in response to obtaining each of the plurality of pieces of abnormality occurrence information. Specifically, in a case of obtaining of the abnormality occurrence information, the video management apparatus (abnormality video generation unit 141), for example, performs cropping for work video data obtained in a period from a few minutes before to a few minutes after the abnormality occurrence time, from the work video data of the first worksite(s) associated with the abnormality occurrence information, to thereby generate the abnormality video data.

(4) Determination of First Worksite Associated with Second Worksite

The first worksite(s) associated with the second worksite is determined as follows, for example.

First, the video management apparatus 100*a* (worksite information obtaining unit 145) obtains second worksite information related to the second worksite, from the second terminal. Here, the second worksite information concretely includes information indicating work environment, worker information, and the like of the second worksite, for example. The information may be, for example, information related to a result of analysis of image data sent from the second terminal. In this case, the analysis of the image data may be performed by the analysis processing unit 147.

Next, the video management apparatus 100*a* (analysis processing unit 147) analyzes the second worksite information to determine the first worksite(s) associated with the second worksite from among the plurality of first worksites. Concretely, the video management apparatus 100*a* (analysis processing unit 147) determines a worksite(s) having a similar work environment(s) to that of the second worksite as the first worksite(s) associated with the second worksite.

(5) Flow of Processing

Figure 2:
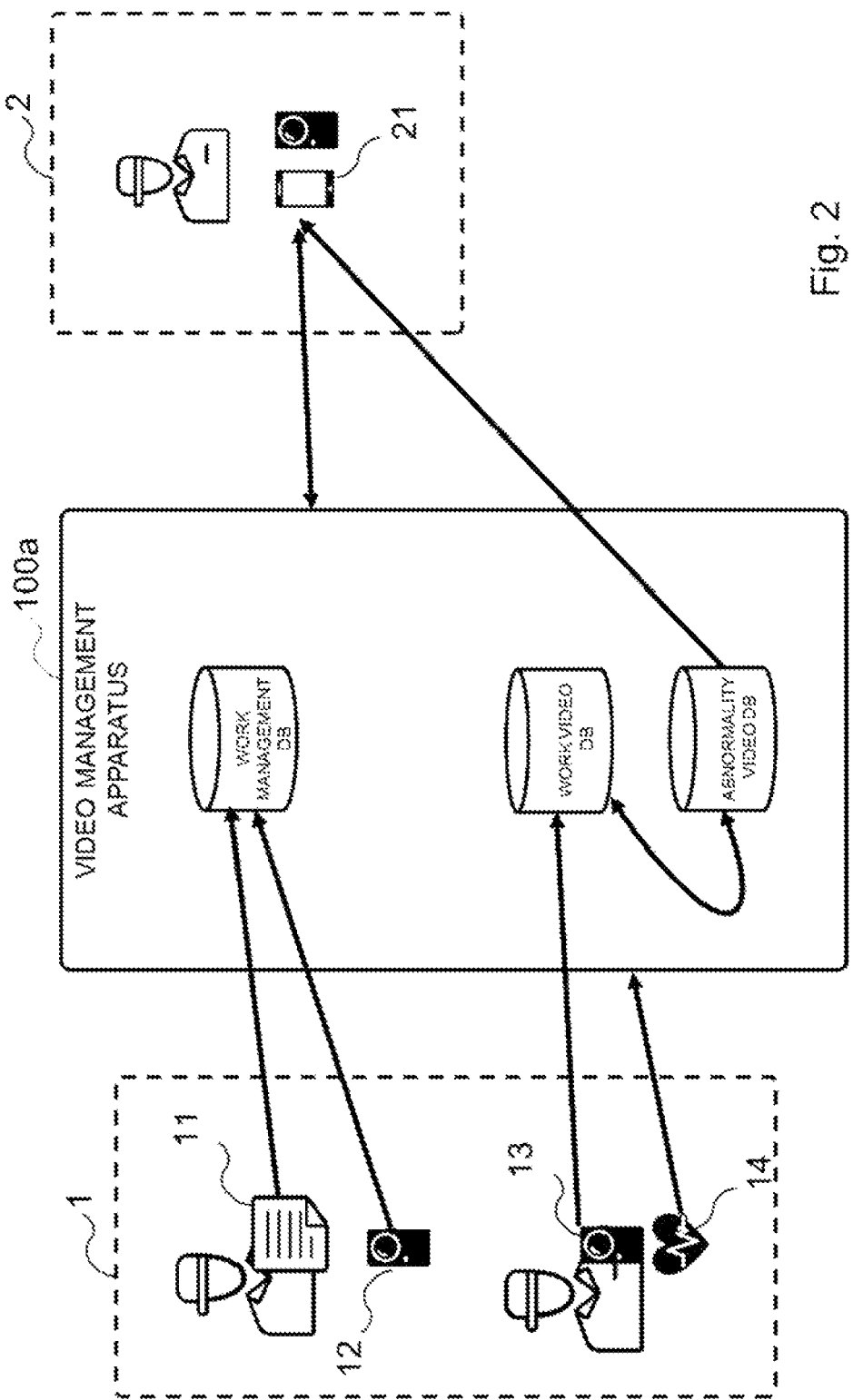

Next, a flow of processing according to the first example embodiment will be described. FIG. 2 is a diagram illustrating a concrete example of terminals sending/receiving data to/from the video management apparatus 100*a*.

With reference to FIG. 2, in a worksite 1 corresponding to any of the first worksites, an electronic danger-prediction-training-sheet registration terminal 11 sends information related to KYT input by a worker, to the video management apparatus 100*a*. In the worksite 1, a photo taking camera 12 captures an image of clothes, equipment, or the like of a worker working in the worksite 1 and sends image data thus obtained to the video management apparatus 100*a*. These sent pieces of information are registered in the work management database 121 in the video management apparatus 100*a*.

In the worksite 1, a work video taking camera 13 obtains work video data of the worksite 1 and sends the work video data thus obtained to the video management apparatus 100*a*. The work video data is registered in the work video database 123 in the video management apparatus 100*a* as described above. In the worksite 1, a wearable terminal 14 detects biometric information of the worker in the worksite 1 and sends, according to a detection result, abnormality occurrence information to the video management apparatus 100*a*. The video management apparatus 100*a* notifies a search terminal 21 to be described below of the abnormality occurrence information and also generates, based on the abnormality occurrence information, abnormality video data from the work video data.

In a worksite 2 corresponding to the second worksite, when the search terminal 21 is notified of the abnormality occurrence information, the search terminal 21 sends worksite information related to the worksite 2. When the video management apparatus 100*a* receives the worksite information related to the worksite 2, the video management apparatus 100*a* searches the abnormality video database 125 for the abnormality video data of a worksite(s) (for example, the worksite(s) 1) associated with the worksite 2 and sends the abnormality video data to the search terminal 21.

Overall Flow of Processing

Figure 3:
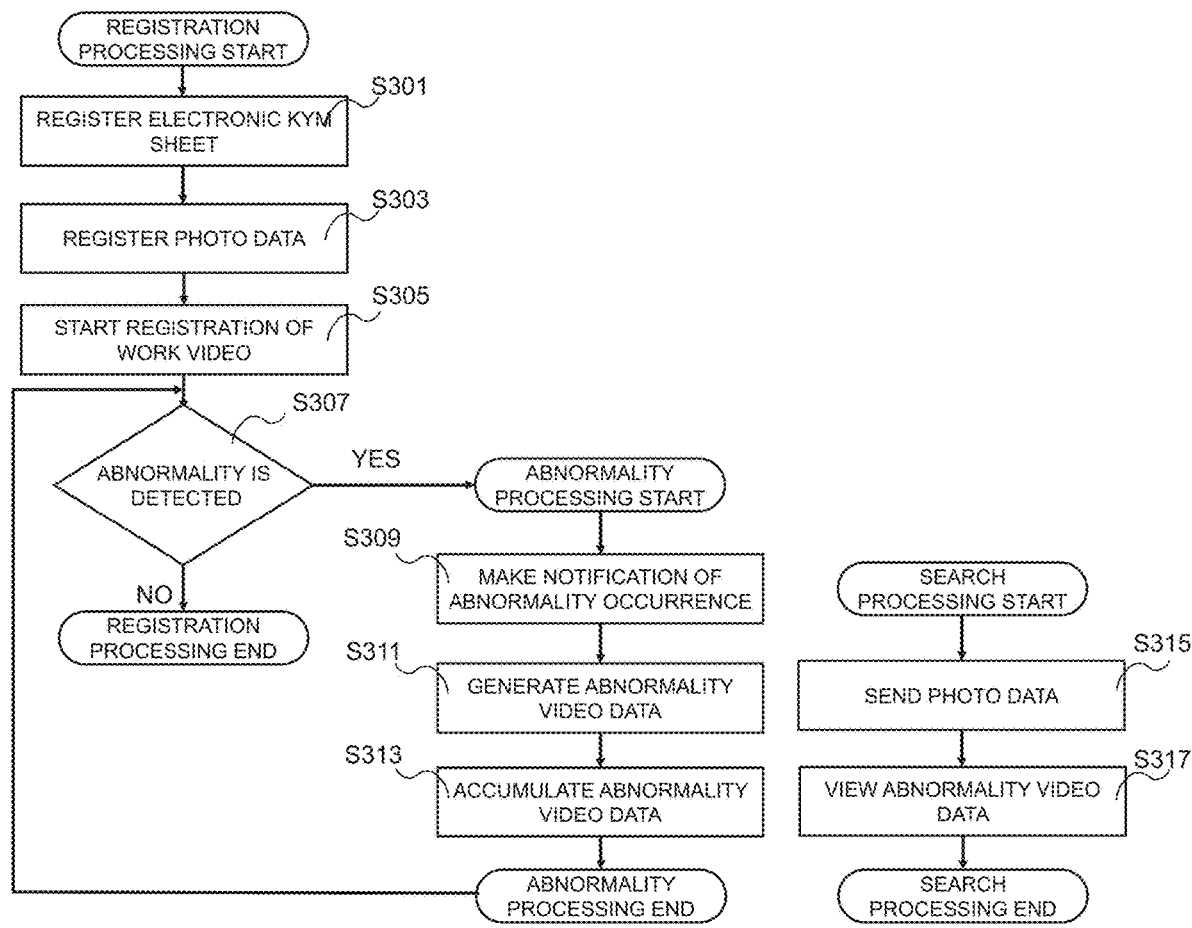
FIG. 3 is a flowchart for describing a flow of overall processing performed between the video management apparatus 100a and various terminals.

FIG. 3 is a flowchart for describing a flow of overall processing performed between the video management apparatus 100a and various terminals.

With reference to FIG. 3, the video management apparatus 100a receives the electronic KYM sheet (information related to KYM) from the electronic danger-prediction-training-sheet registration terminal 11 and registers the electronic KYM sheet in the work management database 121 (S301). Subsequently, the video management apparatus 100a receives photo data from the photo taking camera 12 and registers the photo data to the work management database 121 (S303). Subsequently, the video management apparatus 100a receives work video data from the work video taking camera 13 and starts processing for registering the work video data in the work video database 123 (S305). Subsequently, the video management apparatus 100a determines whether an abnormality has occurred, based on communication with the wearable terminal 14 and, when determining that an abnormality has occurred (S307: YES), starts abnormality processing and advances to step S309, and when determining that no abnormality has occurred (S307), terminates the registration processing.

When the abnormality processing is started, the video management apparatus 100a notifies the search terminal 21 used by the worker in the worksite 2, of information indicating that an abnormality has occurred (S309). Subsequently, the video management apparatus 100a crops the work video data to generate abnormality video data (S311). Subsequently, the video management apparatus 100a accumulates generated abnormality video data in the abnormality video database 125 (S313), terminates the abnormality processing, and returns to step S307.

In response to the notification of the information indicating that an abnormality has occurred (S309), searching processing as follows is performed. First, the search terminal 21 sends the photo data of the worksite 2 to the video management apparatus 100a (S315). Subsequently, the search terminal 21 displays the abnormality video data sent from the video management apparatus 100a in response to sending the photo data (S317) and terminates the searching processing.

Detailed Operations Related to Data Registration

Figure 4:
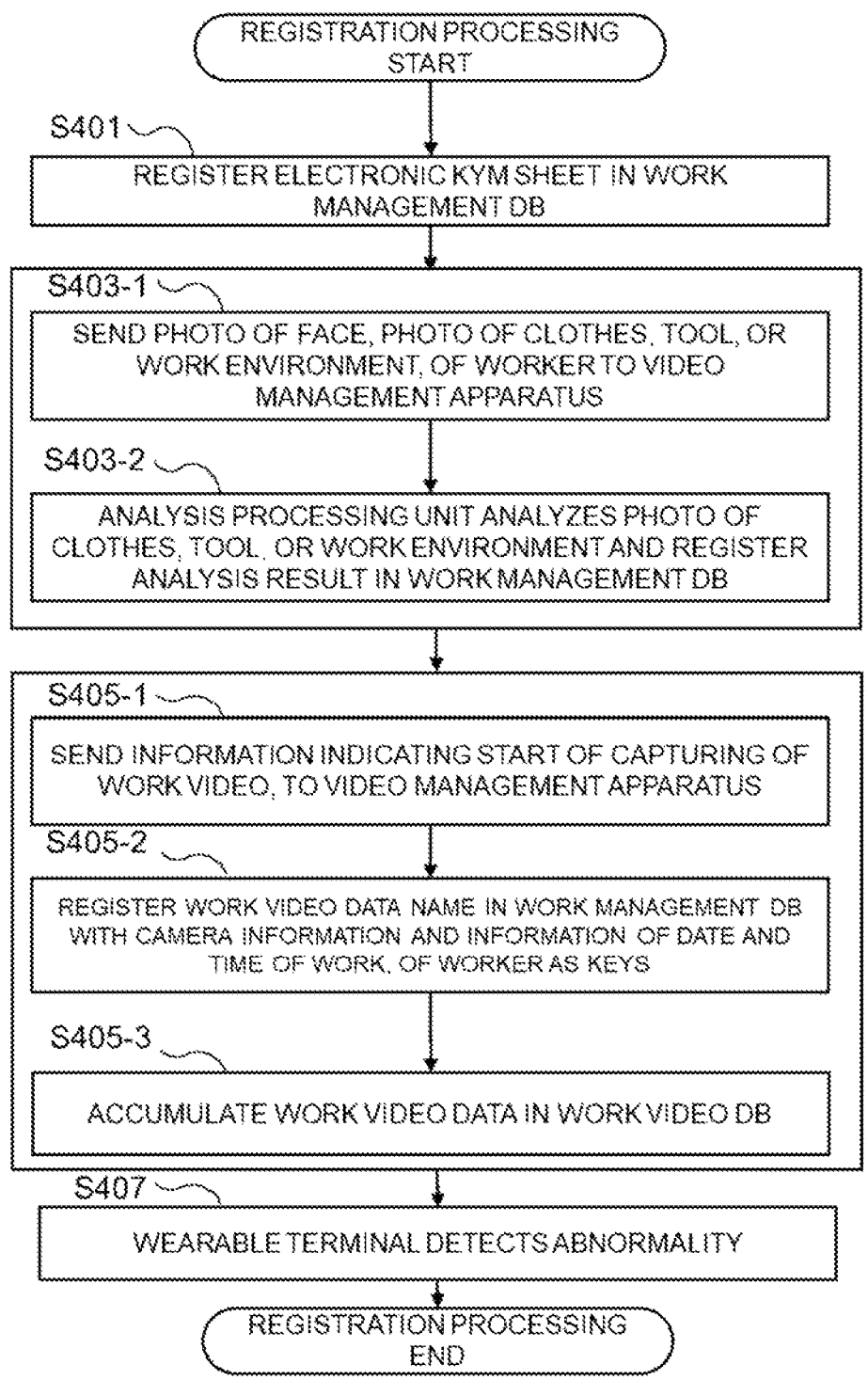
FIG. 4 is a flowchart for describing detailed operations related to registration of various data.

FIG. 4 is a flowchart for describing detailed operations related to registration of various data.

With reference to FIG. 4, the video management apparatus 100a receives an electronic KYM sheet (information related to KYM) from the electronic danger-prediction-training-sheet registration terminal 11 and registers the electronic KYM sheet in the work management database 121 (S401).

Subsequently, the photo taking camera 12 captures a photo of the face and a photo of clothes, a tool, or work environment, of the worker, for example, and sends photo data to the video management apparatus 100a (S403-1). Next, the video management apparatus 100a (analysis processing unit 147) analyzes the photo data sent from the photo taking camera 12 and registers an analysis result in the work management database 121 (S403-2).

Subsequently, the work video taking camera 13 starts capturing of work video data and sends information indicating the start of capturing to the video management apparatus 100a. In response to this, the information indicating the start of capturing is registered in the work management database 121 (S405-1). Subsequently, the video management apparatus 100a registers a work video data name of the work in the work management database 121 with camera information and information of work date and time of the worker as keys (S405-2). Subsequently, the work video taking camera 13 sends the work video data to the video management apparatus 100a. The work video data is thereby accumulated in the work video database 123 (S405-3). Here, the work video database 123 continuously accumulates the work video data for a time period for video taking, but the work video data may be overwritten every certain period, for example, every three days.

Subsequently, the wearable terminal 14 detects an abnormality occurrence, based on the biometric information of the worker (S407). When the wearable terminal 14 detects an abnormality, operations shift to those for the time of abnormality occurrence illustrated in FIG. 5.

Detailed Operations Related to Time of Abnormality Occurrence

Figure 5:
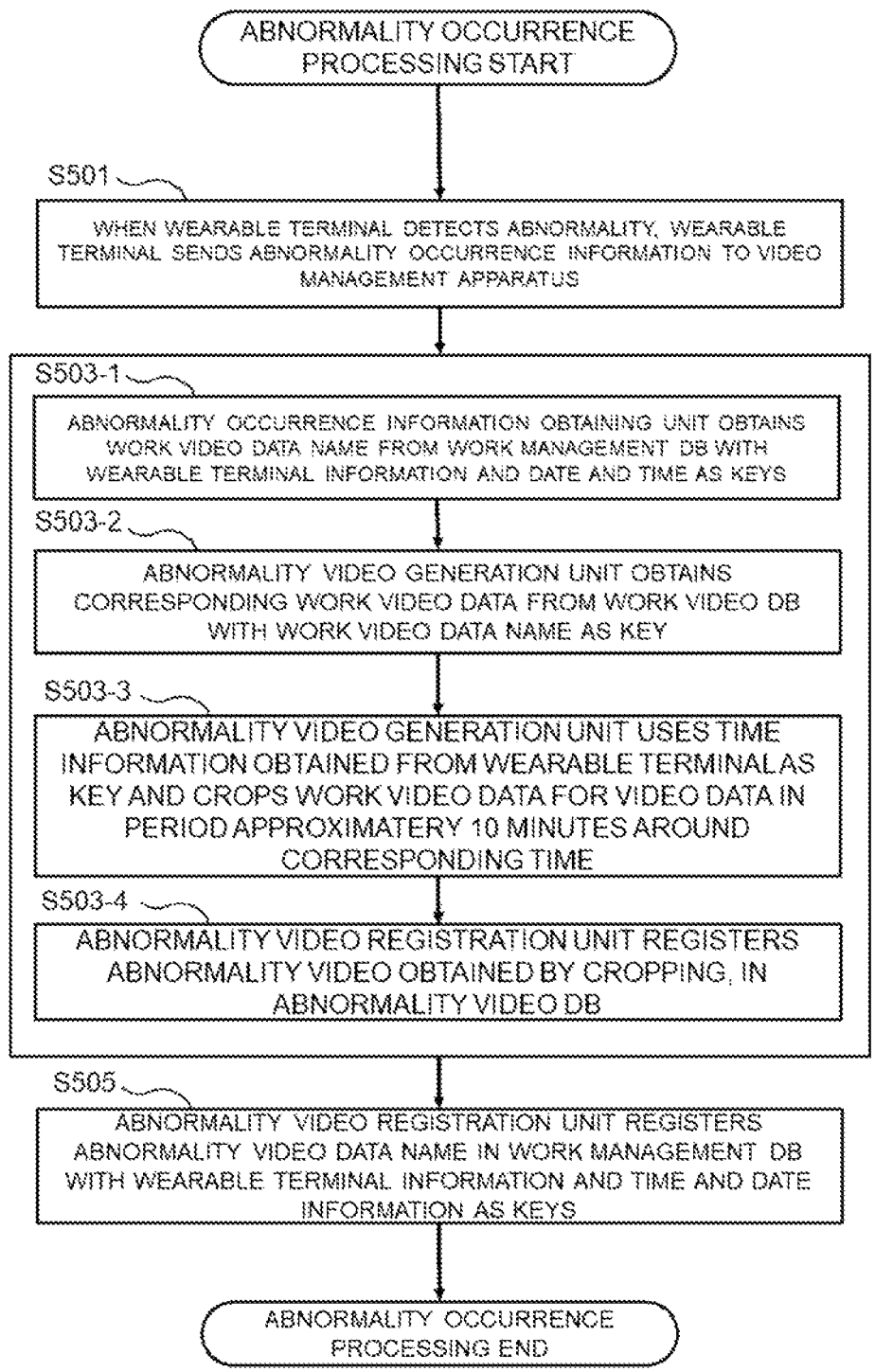
FIG. 5 is a flowchart for describing detailed operations related to a time when an abnormality has occurred.

FIG. 5 is a flowchart for describing detailed operations related to the time of abnormality occurrence.

With reference to FIG. 5, when the wearable terminal 14 detects an abnormality, the video management apparatus 100a sends abnormality occurrence information (S501).

Subsequently, the video management apparatus 100a (abnormality occurrence information obtaining unit 133) searches the work management database 121 with identification information of the wearable terminal 14 and the date and time when the identification information is obtained, as keys, to obtain the work video data name associated with the abnormality occurrence information (S503-1). Subsequently, the video management apparatus 100a (abnormality video generation unit 141) searches the work video database 123 with the work video data name obtained by the abnormality occurrence information obtaining unit 133, as a key, to obtain the work video data corresponding to the work video data name (S503-2). Subsequently, the video management apparatus 100a (abnormality video generation unit 141) perform cropping for the abnormality video data by searching, with the abnormality occurrence information (for example, abnormality occurrence time point information) obtained from the wearable terminal 14, as a key, the work video data for video data of a period approximately 10 minutes around the corresponding time (S503-3). Here, any time period can be configured as a cropping-target time period. Subsequently, the video management apparatus 100a (abnormality video registration unit 135) registers the abnormality video data obtained by the cropping, in the abnormality video database 125 (S503-4).

The video management apparatus 100a (abnormality video registration unit 135) registers an abnormality video data name with the identification information of the wearable terminal 14 and date and time information as keys, in the work management database 121 (S505).

Detailed Operations of Accident Case Search

Figure 6:
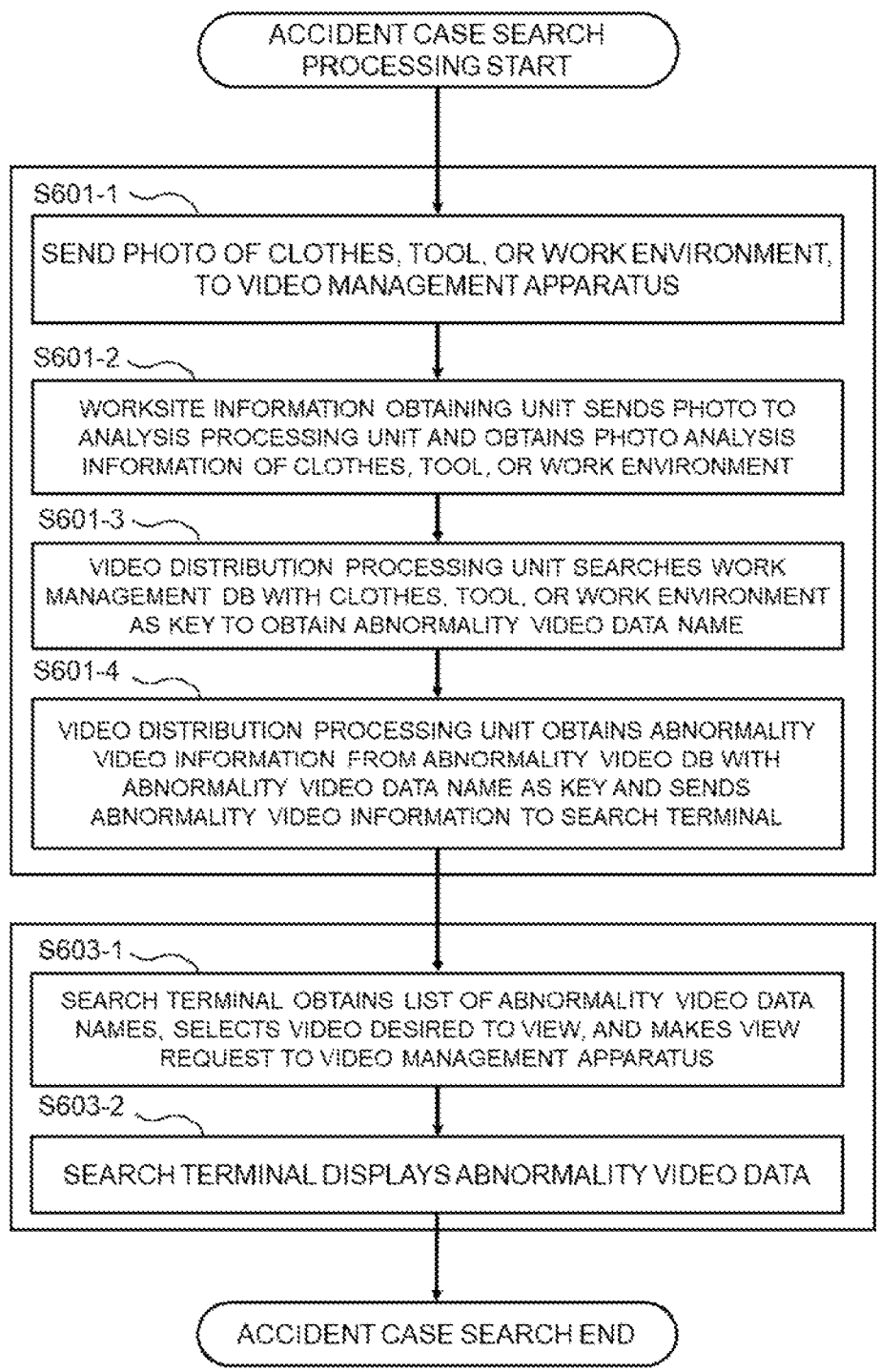
FIG. 6 is a flowchart for describing the detailed operations related to the time when an abnormality has occurred.

FIG. 6 is a flowchart for describing detailed operations related to a time when an abnormality has occurred.

With reference to FIG. 6, the search terminal 21 captures a photo of the face and a photo of clothes, a tool, or work environment, of the worker in the worksite 2, for example, and sends photo data thus obtained to the video management apparatus (S601-1). Subsequently, the video management apparatus 100a (worksite information obtaining unit 145) provides the obtained photo data to the analysis processing unit 147 and obtains photo analysis information of the clothes, a tool, or work environment through an analysis result obtained by the analysis processing unit 147 (S601-2). Subsequently, the video management apparatus 100a (video distribution processing unit 139) searches the work management database 121 with the photo analysis information obtained from the analysis result, as a key, to obtain the abnormality video data name (S601-3). Subsequently, the video management apparatus 100a (video distribution processing unit 139) searches the abnormality video database 125 with the abnormality video data name as a key, to thereby obtain the abnormality video information, and then sends the abnormality video information to the search terminal 21 (S601-4).

Subsequently, the search terminal 21 obtains a list of abnormality video data names from the video management apparatus 100a and provides a request to view view-target abnormality video data to the video management apparatus 100a in response to an operation of a user (for example, a worker) (S603-1). Subsequently, the search terminal 21 obtains abnormality video data from the video management apparatus 100a and displays the abnormality video data in a display or the like (S603-2).

Figure 7:
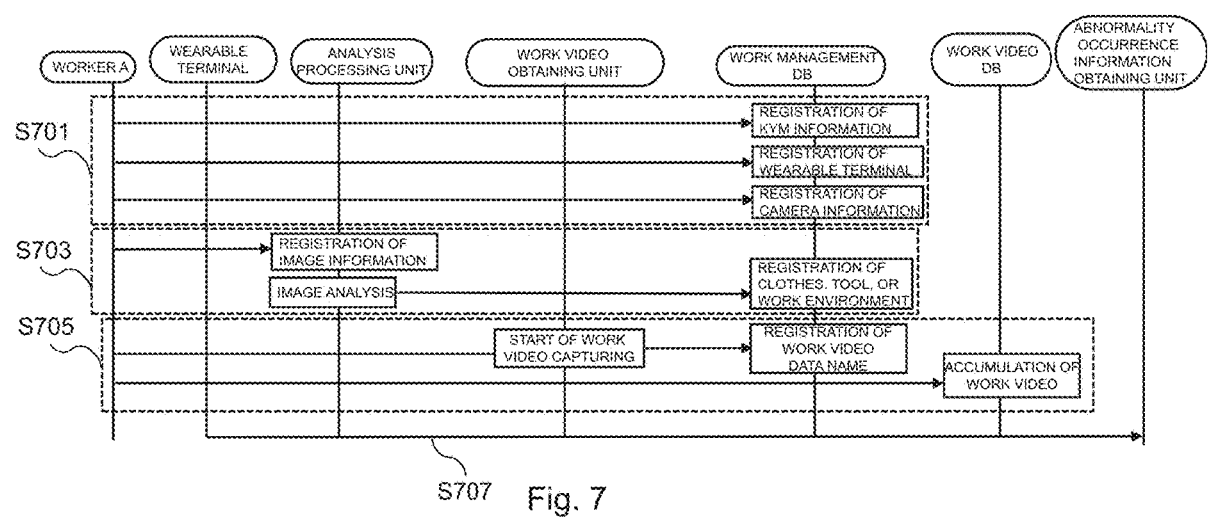

Concrete Operation Example at Time of Registration of KYM Sheet and Clothes, Tool, or the Like FIG. 7 is a diagram illustrating a concrete operation example at a time of registration of a KYM sheet, clothes, a tool, and the like.

With reference to FIG. 7, in electronic KYM sheet registration step S701, information of a wearable terminal used by a worker A and information of a camera used by the worker A are registered.

Subsequently, in photo data registration step S703, data of the type of a vehicle in a worksite where the worker A performs work is input to the analysis processing unit 147. Then, a photo of the face and a photo of clothes (helmet, safety belt, puttees, armband, safety shoes, or the like), a photo of a tool (driver, cutter, torque wrench, or the like), or a photo of work environment (outdoor, indoor, high place, opening part, or the like), of the worker A are analyzed, and information of the analysis is registered in the work management database 121.

In work video taking step S705, a work video of the worksite is captured. A work video data name is registered in the work management database 121 with information of the camera and date and time as a key. The work video data is accumulated in the work video database 123. Under a normal situation, accumulation processing is continued.

Figure 8:
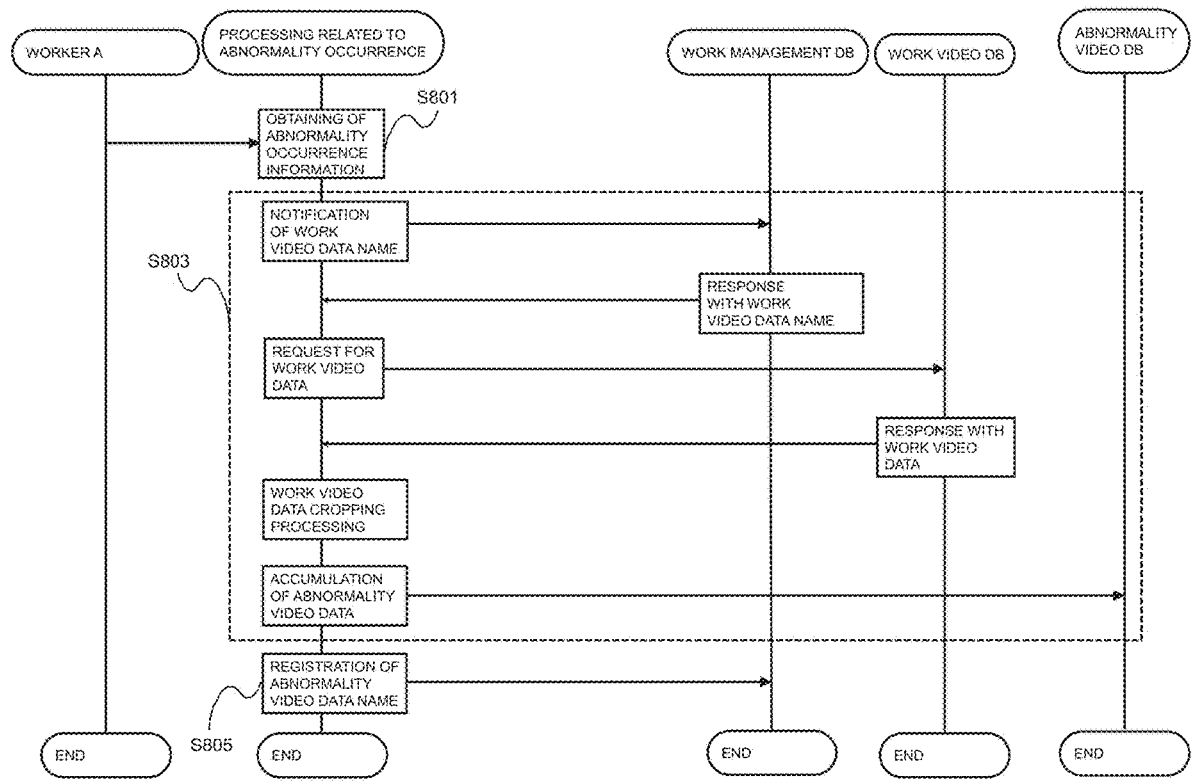
FIG. 8 is a diagram illustrating an operation example in which cropping is performed for an accident video with information (pulse, heart rate) from a wearable terminal as a trigger.

In abnormality occurrence detection step S707, when the wearable terminal used by the worker A detects an abnormality, operations shift to those for the time of abnormality occurrence illustrated in FIG. 8. The operations are performed with biometric information (pulse, heart rate, or the like) obtained from the wearable terminal exceeding a threshold, as a trigger.

Operation Example in which Cropping is Performed for Accident Video

FIG. 8 is a diagram illustrating an operation example in which cropping is performed for an accident video with information (pulse, heart rate) from a wearable terminal as a trigger.

In abnormality occurrence notification step S801, an abnormality is detected with biometric information (pulse, heart rate) obtained from the wearable terminal exceeding a threshold, as a trigger, and the video management apparatus 100a is notified of abnormality occurrence information.

In abnormality video data cropping step S803, cropping is performed for abnormality video data. Concretely, first, the work management database 121 is searched with the identification information of the wearable terminal as a key, and thereby a work video data name is obtained. Then, the work video database 123 is searched with the work video data name as a key, and thereby work video data is obtained.

Then, searching is performed with time information obtained from the wearable terminal as a key, and thereby the work video data is cropped to obtain work video data of a period approximately 10 minutes around the corresponding time as abnormality video data. Then, the abnormality video data thus obtained by the cropping is registered in the abnormality video database 125.

Subsequently, in abnormality video data accumulation step S805, an abnormality video data name is registered with the identification information of the wearable terminal and date and time information as keys, in the work management database 121.

Figure 9:
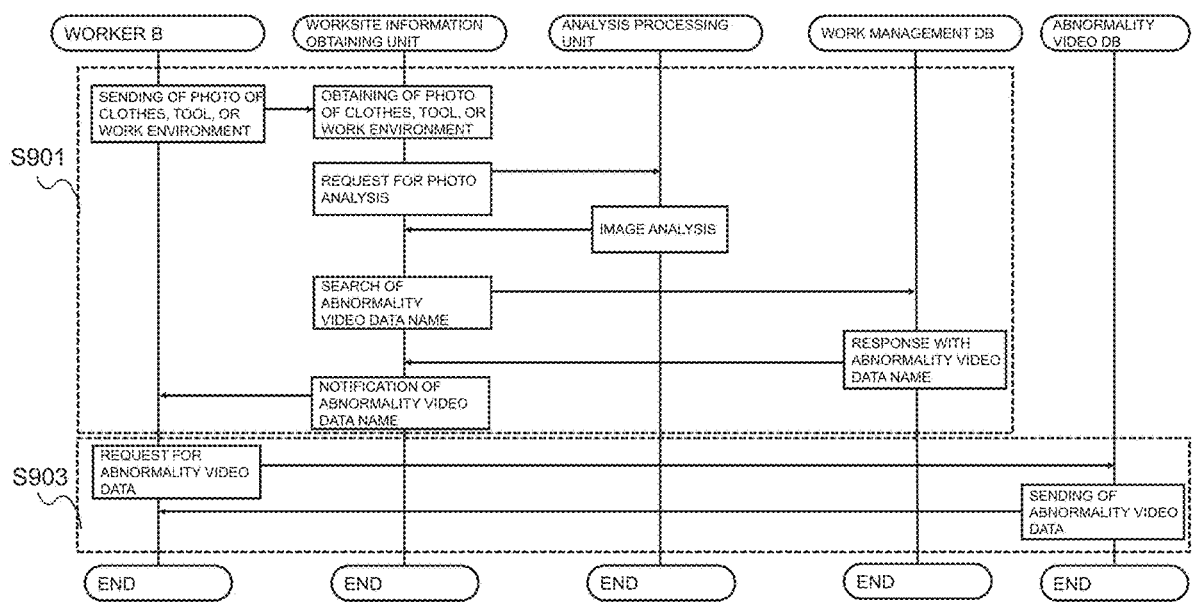
FIG. 9 is a diagram illustrating an operation example of accident search processing based on a search key such as clothes and a tool.

Operation Example of Accident Search Processing Based on Search Key Such as Clothes or Tool FIG. 9 is a diagram illustrating an operation example of accident search processing based on a search key such as clothes or a tool.

With reference to FIG. 9, in photo data sending step S901, a search terminal of a worker B captures a photo of clothes, a tool, work environment of the worker B and sends the photo to the video management apparatus 100a (worksite information obtaining unit 145). Then, the photo data is sent to the analysis processing unit 147, and photo analysis information of the clothes, tool, or work environment is obtained. Then, the work management database 121 is searched with the photo analysis information of the clothes, tool, or work environment as a key, and thereby an abnormality video data name is obtained. Then, the abnormality video database 125 is searched with the abnormality video data name as a key, and thereby abnormality video data information is returned to the search terminal used by the worker B.

Subsequently, in abnormality video data viewing step S903, the search terminal of the worker B selects a video the worker B desires to view from a list of abnormality video data names or a list of thumbnails. A request of the video desired to view is made to the abnormality video database 125, and the video is viewed by the worker B by using the search terminal.

Concrete Example of Various Databases

For example, FIG. 10 is a diagram illustrating a concrete example of information registered in the work management database 121. FIG. 11 is a diagram illustrating a concrete example of information registered in the work video database 123. FIG. 12 is a diagram illustrating a concrete example of information registered in the abnormality video database 125.

(6) Summary

According to the first example embodiment described above, it is possible to appropriately notify in real time, of accident cases that have occurred in a plurality of sites, another site where similar work is performed in the same time zone.

For example, as a concrete example, assume that site works are performed at three locations, i.e., Fukuoka, Osaka, and Tokyo, on the same day. In this case, for example, when an accident occurs at 11 a.m. in Fukuoka, abnormality video data related to the accident is generated. At this event, workers in Osaka and Tokyo can be notified that the abnormality video data is generated, in other words, the accident has occurred.

Further, for example, it is possible, at meetings before work in the worksites in Osaka and Tokyo starting from 1 p.m., to check a video of the accident occurred in Fukuoka, by using the above-described search terminal, and to thereby perform risk assessment to prevent similar errors.

According to the first example embodiment described above, it is possible to automatically collect, store, analyze, and view videos of accident cases and largely reduce man-hours of workers and managers. This allows overall work to be performed in good time and can attempt to fundamentally reduce abnormal situations.

It is also possible to accurately store states of work from various viewpoints without expending man-hours. This allows study of unrecognized abnormal events, problems and measures not found in a posterior analysis, and the like. Consequently, it is possible to share states by using actual videos for the workers to be aware of safety and to thereby inform new workers and beginners of further increasing of awareness and necessity of safety measures at a higher level.

(7) Other Concrete Examples

The abnormality occurrence information may be based on the following information without being limited to information from the wearable terminal described above. The abnormality occurrence information may be based on detection information indicating that a safety belt which should be joined at an elevated area is disjoined, detection information indicating that a worker has disappeared from a specified work area, information obtained by voice recognition such as "be careful" produced at a time of danger, or the like.

A monitoring camera already installed in a worksite may be used without limiting to the photo taking camera 12 and the work video taking camera 13 as in the example illustrated in FIG. 2. A recording time of abnormality video data can be changed depending on a purpose, and the abnormality video data can be used in various aspects. Information of a "list of workers" may be registered in the work management database 121 to allow information necessary for critical care, such as an emergency contact person for in the event of an accident, and blood type, to be immediately referred to.

The video management apparatus 100a can be used in fields such as uses in various constructions and worksites, advanced monitoring cameras, automatic nurse calls and remote examinations in medical treatment, management and monitoring of drivers (such as vehicles, railroads, and airplanes), automated driving, real-time automatic camera work modification (in sports, concerts, and the like), automatic detection of danger prediction in cooperation with wearable terminals, management and monitoring of production sites such as a factory (an abnormality in a production line and the like).

3. SECOND EXAMPLE EMBODIMENT

Next, a description will be given of a second example embodiment with reference to FIG. 13. The above-described first example embodiment is a concrete example embodiment, whereas the second example embodiment is a more generalized example embodiment.

3.1. Configuration of Video Management Apparatus 100b

Figure 13:
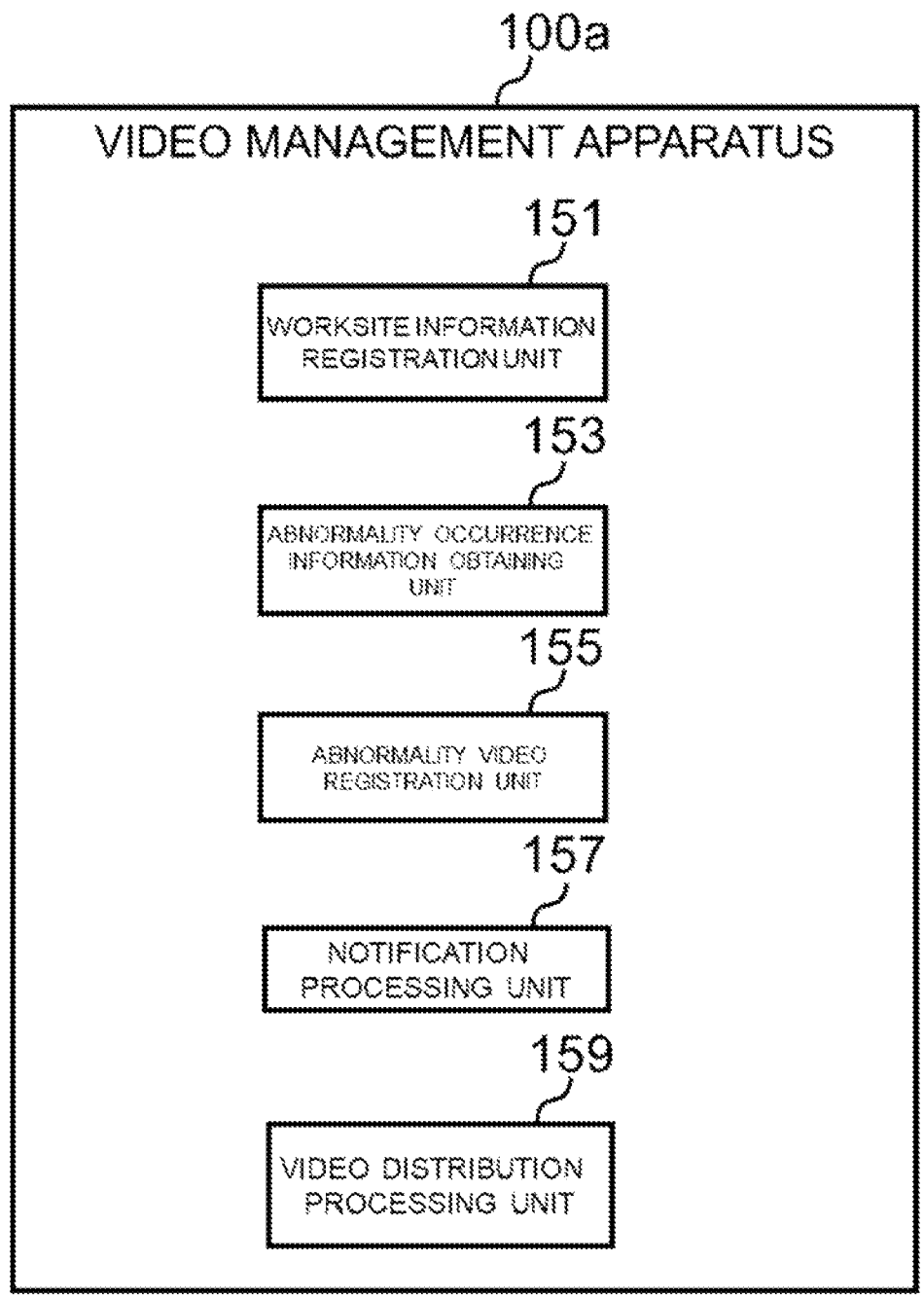
FIG. 13 is a block diagram illustrating an example of a schematic configuration of a video management apparatus 100b according to a second example embodiment.

FIG. 13 is a block diagram illustrating an example of a schematic configuration of a video management apparatus 100b according to the second example embodiment. With reference to FIG. 13, the video management apparatus 100b includes a worksite information registration unit 151, an abnormality occurrence information obtaining unit 153, an abnormality video registration unit 155, a notification processing unit 157, and a video distribution processing unit 159.

The worksite information registration unit 151, the abnormality occurrence information obtaining unit 153, the abnormality video registration unit 155, the notification processing unit 157, and the video distribution processing unit 159 may be implemented with one or more processors, a memory (e.g., a nonvolatile memory and/or a volatile memory) and/or a hard disk. The worksite information registration unit 151, the abnormality occurrence information obtaining unit 153, the abnormality video registration unit 155, the notification processing unit 157, and the video distribution processing unit 159 may be implemented with the same processor or may be implemented separately with different processors. The memory may be included in the one or more processors or may be provided outside the one or more processors.

3.2. Operation Example

An operation example according to the second example embodiment will be described.

According to the second example embodiment, the video management apparatus 100b (worksite information registration unit 151) registers a plurality of pieces of first worksite information related to safety of a respective plurality of first worksites, in a database, depending on information sent from a plurality of first terminals associated with the respective plurality of first worksites.

The video management apparatus 100b (abnormality occurrence information obtaining unit 153) obtains a plurality of pieces of abnormality occurrence information indicating abnormalities that have occurred at the respective plurality of first worksites.

The video management apparatus 100b (abnormality video registration unit 155) associates a plurality of abnormality video data obtained in the respective plurality of first worksites at an abnormality occurrence time, with the respective pieces of first worksite information related to the safety of the respective first worksites, and registers the plurality of abnormality video data in a database, in response to obtaining each of the plurality of pieces of abnormality occurrence information.

The video management apparatus 100b (notification processing unit 157) notifies a second terminal associated with a second worksite, of information related to the registration of the plurality of abnormality video data.

The video management apparatus 100a (video distribution processing unit 159) distributes the abnormality video data associated with the second worksite from among the plurality of abnormality video data to the second terminal, in response to a request from the second terminal.

Relationship with First Example Embodiment

As an example, worksite information registration unit 151, the abnormality occurrence information obtaining unit 153, the abnormality video registration unit 155, the notification processing unit 157, and the video distribution processing unit 159 included in the video management apparatus 100b according to the second example embodiment may perform operations of the worksite information registration unit 131, the abnormality occurrence information obtaining unit 133, the abnormality video registration unit 135, the notification processing unit 137, and the video distribution processing unit 139 included in the video management apparatus 100a according to the first example embodiment, respectively. In this case, the descriptions of the first example embodiment may also be applicable to the second example embodiment. Note that the second example embodiment is not limited to this example.

The second example embodiment has been described above. According to the second example embodiment, it is possible to appropriately notify in real time, of accident cases that have occurred in a plurality of sites, another site where similar work is performed in the same time zone.

4. OTHER EXAMPLE EMBODIMENTS

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

An apparatus including constituent elements (e.g., the worksite information registration unit, the abnormality occurrence information obtaining unit, the abnormality video registration unit, the notification processing unit, and/or the video distribution processing unit) of the video management apparatus described in the Specification (e.g., one or more apparatuses (or units) among a plurality of apparatuses (or units) constituting the video management apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)

A video management apparatus including:
a worksite information registration unit configured to register a plurality of pieces of first worksite information related to safety of a respective plurality of first worksites, in a database, depending on information sent from a plurality of first terminals associated with the respective plurality of first worksites;
an abnormality occurrence information obtaining unit configured to obtain a plurality of pieces of abnormality occurrence information indicating abnormalities occurred at the respective plurality of first worksites;
an abnormality video registration unit configured to associate a plurality of abnormality video data obtained in the respective plurality of first worksites at an abnormality occurrence time, with the respective pieces of first worksite information related to the safety of the respective first worksites, and to register the plurality of abnormality video data in a database, in response to obtaining each of the plurality of pieces of abnormality occurrence information:
a notification processing unit configured to notify a second terminal associated with a second worksite, of information related to the registration of the plurality of abnormality video data; and
a video distribution processing unit configured to distribute the abnormality video data associated with the second worksite from among the plurality of abnormality video data to the second terminal, in response to a request from the second terminal.

(Supplementary Note 2)

The video management apparatus according to supplementary note 1, wherein the plurality of pieces of first worksite information includes respective pieces of information related to respective analysis results of image data sent from the first terminals.

(Supplementary Note 3)

The video management apparatus according to supplementary note 1 or 2, further including
an abnormality video generation unit configured to use work video data obtained in the plurality of first worksites, to generate abnormality video data obtained in the respective first worksites at the abnormality occurrence time, in response to obtaining each of the plurality of pieces of abnormality occurrence information.

(Supplementary Note 4)

The video management apparatus according to supplementary note 3, further including
a work video obtaining unit configured to obtain the work video data obtained in the respective first worksites, in response to registering each of the plurality of pieces of first worksite information.

(Supplementary Note 5)

The video management apparatus according to any one of supplementary notes 1 to 4, further including:
a worksite information obtaining unit configured to obtain second worksite information related to the second worksite, from the second terminal; and
an analysis processing unit configured to analyze the second worksite information and determine the first worksites associated with the second worksite from among the plurality of first worksites.

(Supplementary Note 6)

The video management apparatus according to supplementary note 5, wherein the second worksite information includes information related to an analysis result of image data sent from the second terminal.

(Supplementary Note 7)

The video management apparatus according to any one of supplementary notes 1 to 6, wherein the plurality of pieces of abnormality occurrence information are based on respective pieces of information sent from abnormality detection apparatuses associated with the respective first worksites.

(Supplementary Note 8)

A video management method including:
registering a plurality of pieces of first worksite information related to safety of a respective plurality of first worksites, in a database, depending on information sent from a plurality of first terminals associated with the respective plurality of first worksites;
obtaining a plurality of pieces of abnormality occurrence information indicating abnormalities occurred at the respective plurality of first worksites;

associating a plurality of abnormality video data obtained in the respective plurality of first worksites at an abnormality occurrence time, with the respective pieces of first worksite information related to the safety of the respective first worksites, and registering the plurality of abnormality video data in a database, in response to obtaining each of the plurality of pieces of abnormality occurrence information;

notifying a second terminal associated with a second worksite, of information related to the registration of the plurality of abnormality video data; and distributing the abnormality video data associated with the second worksite from among the plurality of abnormality video data to the second terminal, in response to a request from the second terminal.

(Supplementary Note 9)

A program for causing a computer to execute:

registering a plurality of pieces of first worksite information related to safety of a respective plurality of first worksites, in a database, depending on information sent from a plurality of first terminals associated with the respective plurality of first worksites;

obtaining a plurality of pieces of abnormality occurrence information indicating abnormalities occurred at the respective plurality of first worksites;

associating a plurality of abnormality video data obtained in the respective plurality of first worksites at an abnormality occurrence time, with the respective pieces of first worksite information related to the safety of the respective first worksites, and registering the plurality of abnormality video data in a database, in response to obtaining each of the plurality of pieces of abnormality occurrence information;

notifying a second terminal associated with a second worksite, of information related to the registration of the plurality of abnormality video data; and distributing the abnormality video data associated with the second worksite from among the plurality of abnormality video data to the second terminal, in response to a request from the second terminal.

This application claims priority based on JP 2020-094553 filed on May 29, 2020, the entire disclosure of which is incorporated herein.

INDUSTRIAL APPLICABILITY

It is possible to appropriately notify in real time, of accident cases that have occurred in a plurality of sites, another site where similar work is performed in the same time zone.

REFERENCE SIGNS LIST 100a, 100b Video Management Apparatus
131, 151 Worksite Information Registration Unit
133, 153 Abnormality Occurrence Information Obtaining Unit
135, 155 Abnormality Video Registration Unit
137, 157 Notification Processing Unit
139, 159 Video Distribution Processing Unit

What is claimed is:

1. A video management apparatus comprising:
   a memory storing instructions; and
   one or more processors configured to execute the instructions to:
   register a plurality of pieces of first worksite information related to a respective plurality of first worksites, in a database, depending on information sent from a plurality of first terminals associated with the respective plurality of first worksites;
   obtain a plurality of pieces of abnormality occurrence information indicating abnormalities occurred at the respective plurality of first worksites;
   associate a plurality of abnormality video data obtained in the respective plurality of first worksites at an abnormality occurrence time, with the respective pieces of first worksite information related to the respective first worksites, and to register the plurality of abnormality video data in a database, in response to obtaining each of the plurality of pieces of abnormality occurrence information;
   notify a second terminal associated with a second worksite, of information related to the registration of the plurality of abnormality video data;
   distribute abnormality video data associated with the second worksite from among the plurality of abnormality video data to the second terminal, in response to a request from the second terminal;
   obtain second worksite information related to the second worksite, from the second terminal; and
   analyze the second worksite information and determine at least one of first worksites associated with the second worksite from among the plurality of first worksites.

2. The video management apparatus according to claim 1, wherein the plurality of pieces of first worksite information includes respective pieces of information related to respective analysis results of image data sent from the first terminals.

3. The video management apparatus according to claim 1, wherein
   the one or more processors are configured to use work video data obtained in the plurality of first worksites, to generate abnormality video data obtained in the respective first worksites at the abnormality occurrence time, in response to obtaining each of the plurality of pieces of abnormality occurrence information.

4. The video management apparatus according to claim 3, wherein
   the one or more processors are configured to obtain the work video data obtained in the respective first worksites, in response to registering each of the plurality of pieces of first worksite information.

5. The video management apparatus according to claim 1, wherein the second worksite information includes information related to an analysis result of image data sent from the second terminal.

6. The video management apparatus according to claim 1, wherein the plurality of pieces of abnormality occurrence information are based on respective pieces of information sent from abnormality detection apparatuses associated with the respective first worksites.

7. A video management method comprising:
   registering a plurality of pieces of first worksite information related to a respective plurality of first worksites, in a database, depending on information sent from a plurality of first terminals associated with the respective plurality of first worksites;
   obtaining a plurality of pieces of abnormality occurrence information indicating abnormalities occurred at the respective plurality of first worksites;
   associating a plurality of abnormality video data obtained in the respective plurality of first worksites at an abnormality occurrence time, with the respective pieces of first worksite information related to the respective first worksites, and registering the plurality of abnormality video data in a database, in response to obtaining each of the plurality of pieces of abnormality occurrence information;

notifying a second terminal associated with a second worksite, of information related to the registration of the plurality of abnormality video data;

distributing abnormality video data associated with the second worksite from among the plurality of abnormality video data to the second terminal, in response to a request from the second terminal;

obtaining second worksite information related to the second worksite, from the second terminal; and analyzing the second worksite information and determine at least one of first worksites associated with the second worksite from among the plurality of first worksites.

8. A non-transitory computer readable recording medium storing a program for causing a computer to execute:

registering a plurality of pieces of first worksite information related to a respective plurality of first worksites, in a database, depending on information sent from a plurality of first terminals associated with the respective plurality of first worksites;

obtaining a plurality of pieces of abnormality occurrence information indicating abnormalities occurred at the respective plurality of first worksites;

associating a plurality of abnormality video data obtained in the respective plurality of first worksites at an abnormality occurrence time, with the respective pieces of first worksite information related to the respective first worksites, and registering the plurality of abnormality video data in a database, in response to obtaining each of the plurality of pieces of abnormality occurrence information;

notifying a second terminal associated with a second worksite, of information related to the registration of the plurality of abnormality video data;

distributing the abnormality video data associated with the second worksite from among the plurality of abnormality video data to the second terminal, in response to a request from the second terminal;

obtaining second worksite information related to the second worksite, from the second terminal; and analyzing the second worksite information and determine at least one of first worksites associated with the second worksite from among the plurality of first worksites.

* * * * *